(12) United States Patent
Roach et al.

(10) Patent No.: US 10,876,479 B2
(45) Date of Patent: Dec. 29, 2020

(54) ACOUSTIC LINER HAVING MULTIPLE LAYERS

(71) Applicant: MRA Systems, LLC, Baltimore, MD (US)

(72) Inventors: Andrew Michael Roach, Aberdeen, MD (US); David Patrick Calder, Baltimore, MD (US); Graham Frank Howarth, Middletown, DE (US)

(73) Assignee: MRA SYSTEMS, LLC., Baltimore, MD (US)

( * ) Notice: Subject to any disclaimer, the term of this patent is extended or adjusted under 35 U.S.C. 154(b) by 272 days.

(21) Appl. No.: 15/442,158

(22) Filed: Feb. 24, 2017

(65) Prior Publication Data
US 2018/0245515 A1 Aug. 30, 2018

(51) Int. Cl.
| | |
|---|---|
| *F02C 7/24* | (2006.01) |
| *B32B 3/26* | (2006.01) |
| *B32B 3/12* | (2006.01) |
| *B32B 15/04* | (2006.01) |
| *B32B 15/20* | (2006.01) |
| *F02C 7/045* | (2006.01) |

(Continued)

(52) U.S. Cl.
CPC ............... *F02C 7/24* (2013.01); *B32B 3/12* (2013.01); *B32B 3/266* (2013.01); *B32B 15/046* (2013.01); *B32B 15/20* (2013.01); *F02C 7/045* (2013.01); *B32B 5/18* (2013.01); *B32B 2307/102* (2013.01); *B32B 2307/7265* (2013.01); *B32B 2605/18* (2013.01); *F02K 3/06* (2013.01); *F05D 2220/323* (2013.01); *F05D 2250/283* (2013.01); *F05D 2260/963* (2013.01); *F05D 2300/601* (2013.01); *Y02T 50/60* (2013.01)

(58) Field of Classification Search
CPC ... F02C 7/24; F02C 7/045; B32B 3/12; B32B 3/266; F02K 1/827
See application file for complete search history.

(56) References Cited

U.S. PATENT DOCUMENTS

| | | | | |
|---|---|---|---|---|
| 4,235,303 A | * | 11/1980 | Dhoore ................. | B64D 33/02 181/214 |
| 4,421,811 A | * | 12/1983 | Rose ....................... | B32B 3/12 428/116 |
| 6,087,407 A | | 7/2000 | Coronado et al. | |

(Continued)

FOREIGN PATENT DOCUMENTS

| | | | |
|---|---|---|---|
| CN | 106005445 A | 10/2016 | |
| WO | 2014/111068 A2 | 7/2014 | |
| WO | WO-2014111068 A2 * | 7/2014 | ........... G10K 11/172 |

OTHER PUBLICATIONS

International Search Report and Written Opinion issued in connection with corresponding PCT Application No. PCT/US2018/013762 dated Nov. 7, 2018.

(Continued)

*Primary Examiner* — Nathaniel E Wiehe
*Assistant Examiner* — John S Hunter, Jr.
(74) *Attorney, Agent, or Firm* — Xsensus LLP

(57) ABSTRACT

An acoustic liner can include a support layer having a set of partitioned cavities with open faces, a first facing sheet and second facing sheet both having perforations and operably coupled to the support layer such that the facing sheets overlie and close the open faces, and an aerogel layer operably coupled to the second facing sheet.

22 Claims, 5 Drawing Sheets

(51) Int. Cl.
*B32B 5/18* (2006.01)
*F02K 3/06* (2006.01)

(56) References Cited

U.S. PATENT DOCUMENTS

| | | | | |
|---|---|---|---|---|
| 6,209,679 | B1* | 4/2001 | Hogeboom | F02C 7/045 |
| | | | | 181/213 |
| 7,977,411 | B2 | 7/2011 | Williams et al. | |
| 8,196,704 | B2* | 6/2012 | Chiou | G10K 11/168 |
| | | | | 181/214 |
| 8,461,223 | B2 | 6/2013 | Lee et al. | |
| 8,499,887 | B2* | 8/2013 | Gleine | B60R 13/0815 |
| | | | | 181/292 |
| 8,646,574 | B2* | 2/2014 | Drevon | B32B 3/14 |
| | | | | 181/292 |
| 2003/0134916 | A1 | 7/2003 | Hrubesh | |
| 2005/0076644 | A1* | 4/2005 | Hardwicke | F02C 7/24 |
| | | | | 60/772 |
| 2009/0045009 | A1* | 2/2009 | Chiou | G10K 11/168 |
| | | | | 181/290 |
| 2009/0250293 | A1* | 10/2009 | Gleine | B60R 13/0815 |
| | | | | 181/292 |
| 2012/0228051 | A1* | 9/2012 | Drevon | B32B 3/14 |
| | | | | 181/222 |
| 2012/0308369 | A1 | 12/2012 | Maheshwari et al. | |
| 2014/0299712 | A1 | 10/2014 | Waldrop, III et al. | |
| 2016/0084196 | A1 | 3/2016 | Lee et al. | |
| 2016/0138212 | A1 | 5/2016 | Joung et al. | |

OTHER PUBLICATIONS

International Preliminary Report on Patentability dated Aug. 27, 2019 in International Application PCT/US2018/013762.
Written Opinion and International Search Report dated Nov. 7, 2018 in International Application PCT/US2018/013762.

* cited by examiner

US 10,876,479 B2

ACOUSTIC LINER HAVING MULTIPLE LAYERS

BACKGROUND OF THE INVENTION

Acoustic attenuation panels can be utilized to reduce noise. For example, aircraft can include acoustic attenuation panels in engine nacelles to reduce noise emissions from turbine engines. Acoustic attenuation panels generally have a sandwich structure that includes sheets enclosing a cellular honeycomb-type inner structure.

BRIEF DESCRIPTION OF THE INVENTION

In one aspect, an acoustic liner includes a support layer having a first side and a spaced second side, where the support layer includes a set of partitioned cavities extending between the first side and the second side, and where the set of partitioned cavities have open faces. The acoustic liner also includes a first facing sheet operably coupled to the support layer such that the first facing sheet overlies and closes the open faces on the first side, with a set of perforations included in the first facing sheet, and in fluid communication with cavities included in the set of partitioned cavities to form a set of acoustic resonators. The acoustic liner also includes a second facing sheet operably coupled to the support layer such that the second facing sheet overlies and closes the open faces on the second side, with a set of perforations included in the second facing sheet, and in fluid communication with cavities included in the set of partitioned cavities. The acoustic liner further includes an aerogel layer operably coupled to the second facing sheet on an opposite side of the second facing sheet from the support layer.

In another aspect, an aircraft engine assembly includes an aircraft engine, a nacelle configured to surround the aircraft engine and having an inlet section that defines an inlet open to ambient air, and where the nacelle at least partially defines an annular airflow path through the assembly. The aircraft engine assembly also includes at least one acoustic panel operably coupled to at least one of the aircraft engine or the nacelle, and includes a support layer having a first side and a spaced second side and where the support layer includes a set of partitioned cavities extending between the first side and the second side and where the set of partitioned cavities have open faces. The acoustic panel further includes a first facing sheet operably coupled to the support layer such that the first facing sheet overlies and closes the open faces on the first side, with a set of perforations included in the first facing sheet, and in fluid communication with cavities included in the set of partitioned cavities to form a set of acoustic resonators, as well as a second facing sheet operably coupled to the support layer such that the second facing sheet overlies and closes the open faces on the second side, with a set of perforations included in the second facing sheet, and in fluid communication with cavities included in the set of partitioned cavities, and an aerogel layer operably coupled to the second facing sheet on an opposite side of the second facing sheet from the support layer, wherein the first facing sheet is contiguous with the annular airflow path.

DESCRIPTION OF EMBODIMENTS OF THE INVENTION

Figure 1:
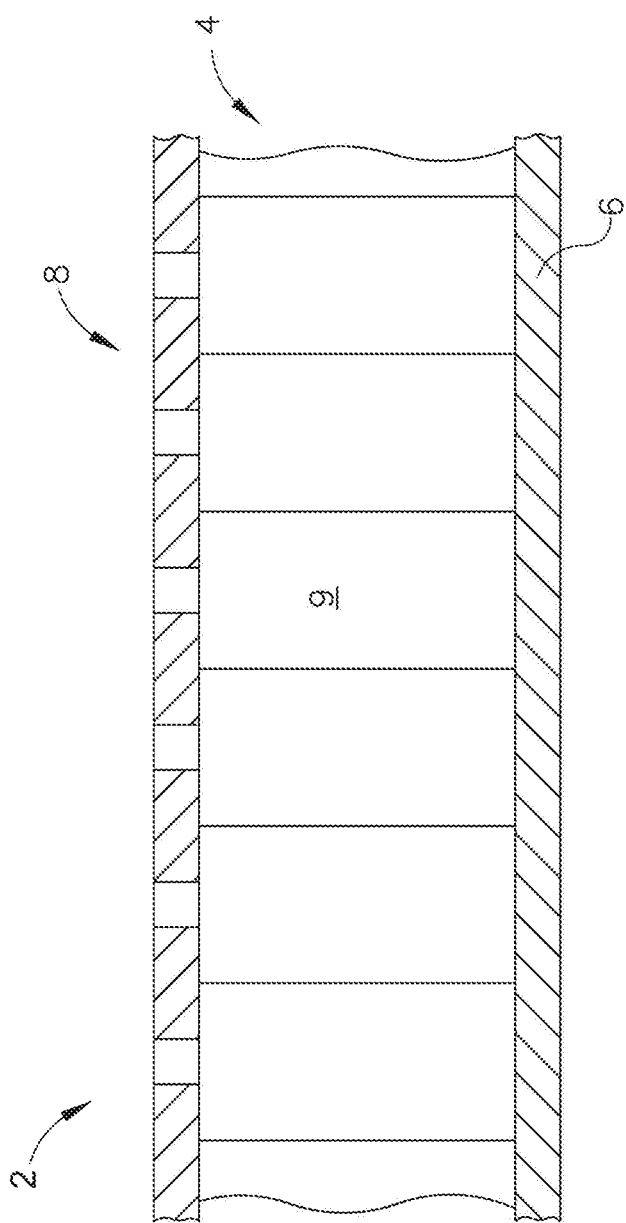
FIG. 1 is a side sectional view of a typical acoustic panel according to the prior art.

Contemporary aircraft engine and nacelle structures typically include acoustic attenuation panels having a perforated, acoustic facing skin. FIG. 1 shows a side view of a typical acoustic panel according to the prior art. The acoustic panel 2 includes an open framework 4 disposed between an imperforate backing sheet 6 and a perforated sheet or facing sheet 8. The open framework 4 forms a support layer having a set of partitioned cavities or cells 9 with open faces. The open framework 4 has open faces on opposing front and rear sides of the open framework 4. In this manner, the open framework 4 forms a set of cells 9 in the open spaces between the open framework 4, the backing sheet 6 and the facing sheet 8.

Figure 2:
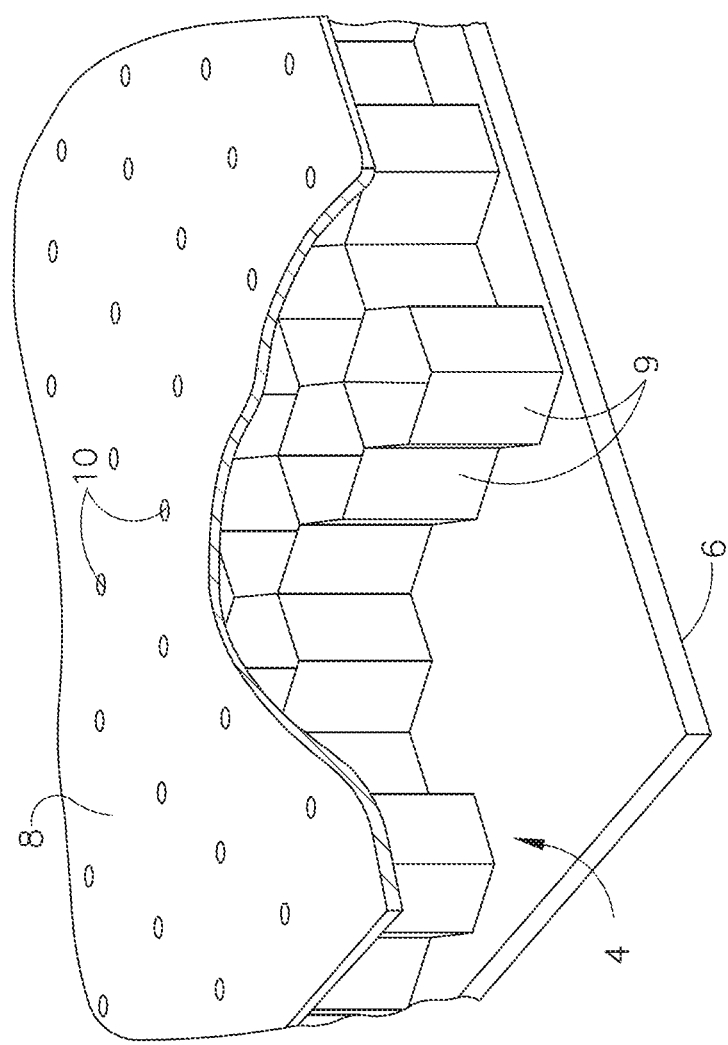
FIG. 2 is a perspective view of the acoustic panel of FIG. 1 with portions removed for clarity.

As illustrated more clearly in FIG. 2, the cells 9 formed by the open framework 4 are disposed between the backing sheet 6 and the facing sheet 8 each have a predetermined volume defined by the geometry of the open framework 4 and the spacing between the backing sheet 6 and the facing sheet 8. The open framework 4 can include a honeycomb structure wherein the cells have six walls formed by the open framework 4, a bottom wall formed by the backing sheet 6 and a top wall formed by the facing sheet 8. The backing sheet 6 can be impervious with respect to air. More specifically, the backing sheet 6 can be an imperforate sheet supported by the support layer or open framework 4 on an opposite side of the open framework 4 than the facing sheet 8. In this manner, the imperforate sheet is on a back side of the open framework 4 and closes off the open faces on the back side.

The facing sheet 8 can be perforated such that a set of perforations 10, which form inlets, in a predetermined pattern are formed in the facing sheet 8 to allow air into selected cells 9. The facing sheet 8 can be supported by the open framework 4 such that perforations 10 are in overlying relationship with the open faces of the open framework 4 to form paired perforations 10 and cavities that define the acoustic resonator cells 9. The perforated sheet can be directly supported on the open framework 4. Alternatively, an intervening layer can be utilized. The facing sheet 8 can be formed from any suitable material including, but not limited to, a composite material. The perforations 10 can be identical in area or can vary in area in different zones of the perforated sheet. The backing sheet 6 and facing sheet 8 and open framework 4 can be formed such that there are no seams present in backing sheet 6 and facing sheet 8 and open framework 4.

Cells 9 can form a portion of an acoustic resonator. For instance, the area of the perforation 10 and thickness of the facing sheet 8 can define neck portions of the Helmholtz resonators, and the volume of the cells 9 can define the cavity volume. The resonators can be tuned to attenuate predetermined frequencies associated with engine sounds entering the acoustic resonators; tuning can be done by multiple processes well understood by those practiced in the art of acoustic design. The honeycomb cells 9 can be a single layer of hexagonal geometry or multiple layers of the same or different geometry separated by a porous layer, typically identified as a septum. In addition, alternate geometries other than hexagonal can be envisaged including random size cells formed by open cell foams or similar materials.

Aspects described herein include the use of perforations in the acoustic skin as well as an aerogel layer attached to the skin. As used herein, "aerogel" or "polyimide aerogel" can include any suitable aerogel materials configured, selected, or enabled to withstand the operating environment of the application, such as in a gas turbine engine.

Figure 3:
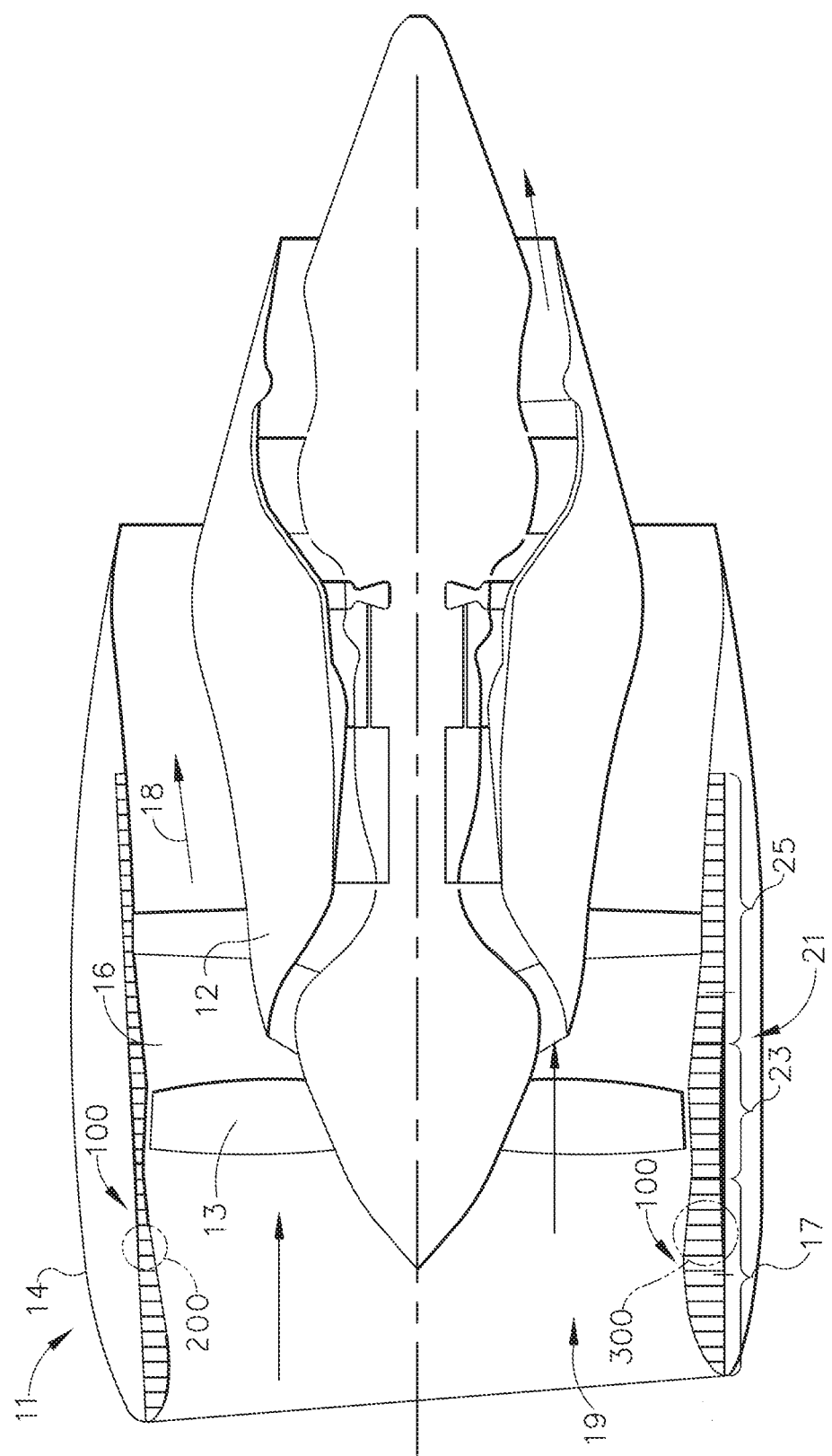
FIG. 3 is a schematic view of an aircraft engine assembly having an acoustic panel in accordance with various aspects described herein, with a portion of the outer nacelle cut away for clarity.

It will be understood that acoustic panels can be utilized in a variety of environments. FIG. 3 illustrates an exemplary environment of an aircraft engine assembly 11 having a turbine engine 12, a fan assembly 13, and a nacelle 14. Portions of the nacelle 14 have been cut away for clarity. The nacelle 14 surrounds the turbine engine 12 and has an inlet section 17 that defines an inlet 19 open to ambient air and an annular airflow path or annular bypass duct 16 through the aircraft engine assembly 11 to define a generally forward-to-aft bypass airflow path as schematically illustrated by the arrow 18. The turbine engine 12 can have a fan section 21 that includes an annular fan case 23 and an aft duct 25 of a thrust reverser (not shown). The fan section 21 can be provided within the nacelle 14 wherein the fan section 21 is in fluid communication with the inlet 19. An annular acoustic panel or acoustic liner 100 can be provided within at least a portion of the nacelle 14. By way of non-limiting example, the acoustic liner has been illustrated at the inlet 19, fan section 21, and aft duct 25. The acoustic liner 100 is configured to attenuate noise in the aircraft engine assembly 11 and defines the through air flow.

The acoustic liner generally described above can accommodate only a portion of the broadband noise created by an aircraft engine such as the aircraft engine assembly 11. With the advent of higher bypass turbofan engines with larger, slower turning fans 13, the acoustic signature of the aircraft engine assembly 11 has trended towards lower sound frequencies. Such an aircraft engine assembly 11 creates broadband noise, including multiple frequency peaks. This is against an environment where there is a continued search for improved aircraft and engine performance requiring lower weight and also, in the case of engine nacelles, reduced thickness to optimize engine installation and reduce overall size and resulting aerodynamic drag.

Figure 4:
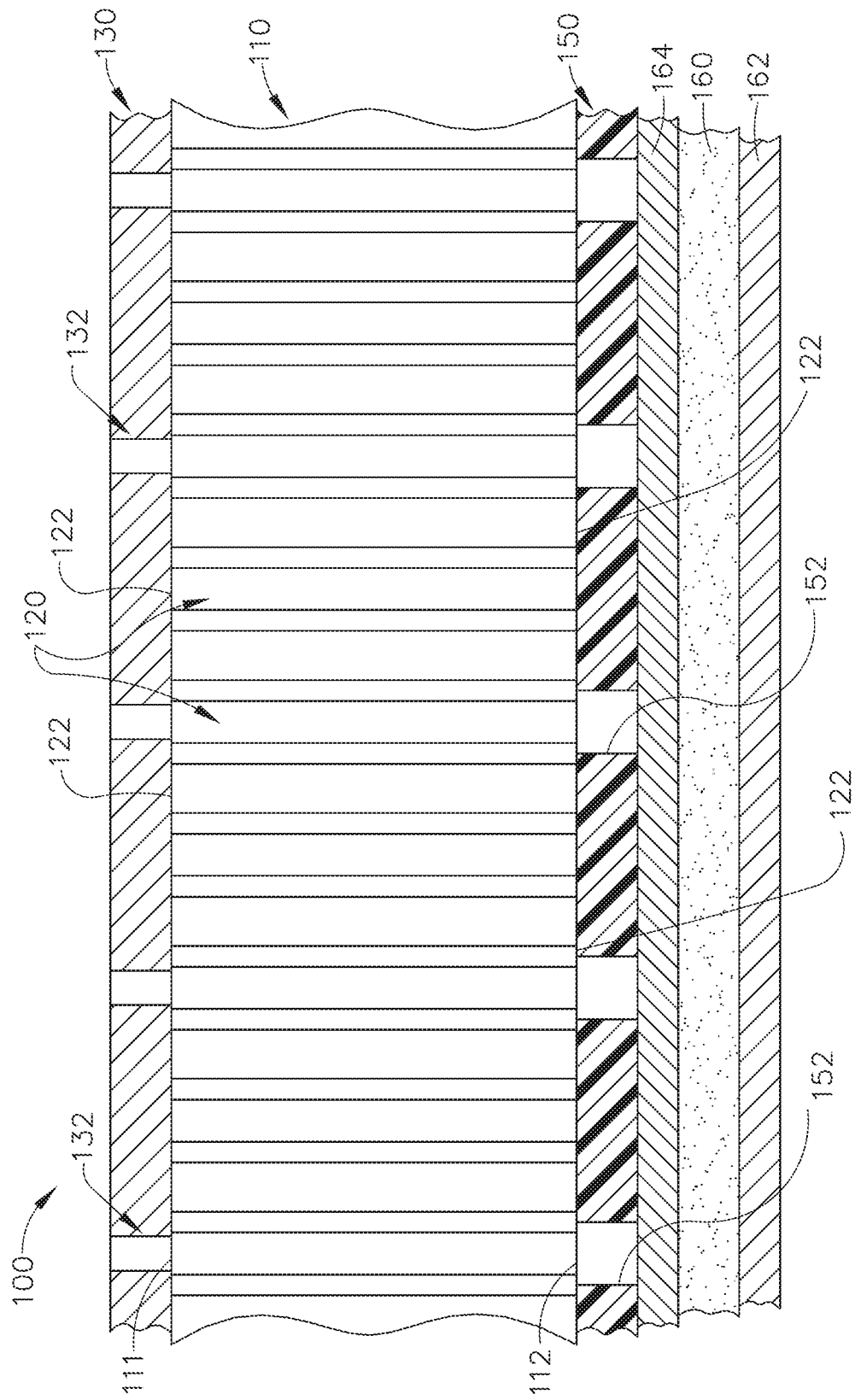
FIG. 4 is a side sectional view of the acoustic panel of FIG. 3.

In accordance with an aspect of the disclosure, FIG. 4 shows a cross-sectional view of a portion of the annular acoustic liner 100 of FIG. 3. A support layer 110 having a first side 111 and a second side 112 spaced from the first side 111 is included, and the support layer 110 can comprise any suitable material such as aluminum, nomex, fiberglass, corrosion resistant steel, or thermoplastic. A set of partitioned cavities 120 extends between the first side 111 and second side 112, and the cavities 120 may have open faces 122 on the first and second sides 111, 112 (shown in more detail in FIG. 5).

A first facing sheet 130 can be operably coupled to the support layer 110 such that the first facing sheet 130 overlies and closes the open faces 122 on the first side 111. A first set of perforations 132 is included in the first facing sheet 130 and are in fluid communication with the set of partitioned cavities 120. A second facing sheet 150 can be operably coupled to the support layer 110, overlying and closing the open faces 122 on the second side 112. A second set of perforations 152 can be included in the second facing sheet 150 and are in fluid communication with the set of partitioned cavities 120. It is contemplated that either or both of the first and second set of perforations 132, 152 can correlate with the set of cavities 120 such that a perforation 132, 152 can be provided for every cavity in the set of cavities 120 as shown.

An open cell layer 160 such as sponge, foam, gel, or a fibrous textile can also be included in the acoustic liner 100. The open cell layer 160 can include, but is not limited to, an aerogel layer 160 operably coupled to the second facing sheet 150 on an opposite side from the support layer 110 as shown. Additionally, a metallic skin layer 162 can be included adjacent the aerogel layer 160, as well as a membrane 164 located between the second facing sheet 130 and the aerogel layer 160. The membrane 164 can comprise a metallic or non-metallic material including a mesh, perforated material, or non-rigid material, and can be configured to be acoustically transparent as well as to block fluids. As a result, sound generated outside the acoustic liner 100 can move through the cavities 120 and second set of perforations 152 to enter the aerogel layer 160 for additional noise attenuation.

Figure 5:
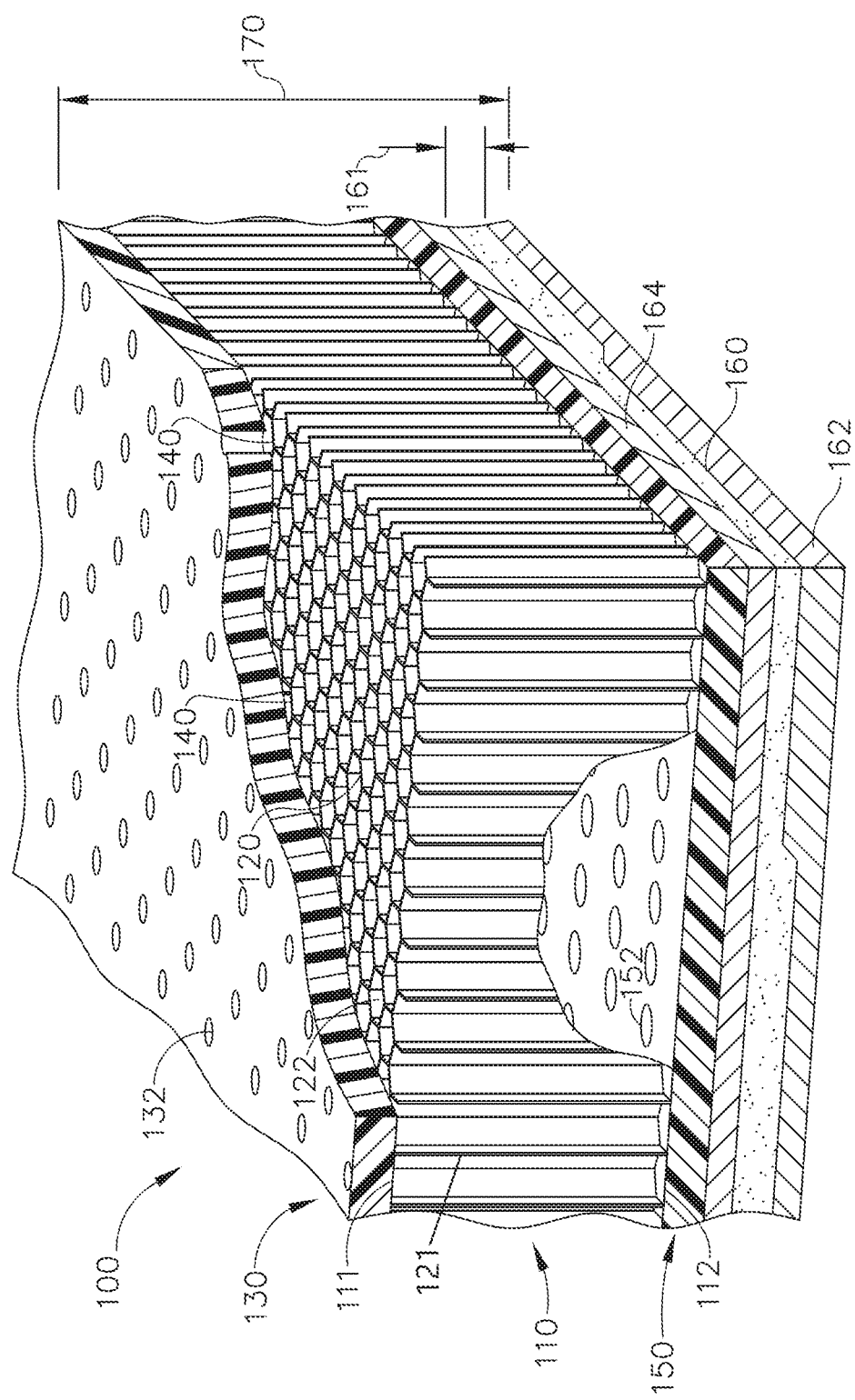
FIG. 5 is a perspective view of the acoustic panel of FIG. 3 with portions removed for clarity.

As illustrated more clearly in FIG. 5, the partitioned cavities 120 illustrated herein as having a honeycomb profile can be formed by an open framework 121 disposed between the second facing sheet 150 and the first facing sheet 130. The partitioned cavities 120 each have a predetermined volume defined by the geometry of the open framework 121 and the spacing between the second facing sheet 150 and the first facing sheet 130. The partitioned cavities 120 in the honeycomb profile can have six walls formed by the open framework 121, a bottom wall formed by the second facing sheet 150 and a top wall formed by the first facing sheet 130.

The first and second sets of perforations 132, 152 can form inlets in a predetermined pattern to allow air into selected cavities 120 as well as into the aerogel layer 160. A perforation in the set of perforations 132, 152 can be identical in area or spacing, or can vary in area in different zones of the perforated sheet; it is contemplated that a perforation in the second set of perforations 152 can have a larger cross-sectional area than a perforation in the first set of perforations 132, and further, that the geometrical profile of the set of perforations 132 may differ from that of the set of perforations 152, such as round, elliptical, rectangular, or irregular, in non-limiting examples for both sets of perforations 132, 152. It is also contemplated that the second sheet 150 can have a larger percentage of open area than the first sheet 130 due to variations between the first and second sets of perforations 132, 152.

The cavities 120 can also form a portion of an acoustic resonator 140, such as a Helmholtz resonator as described above, with the first set of perforations 132 and first facing sheet 130 forming the smaller neck portions, the volume of the cavities 120 defining the cavity volume, and the second set of perforations 152 and second facing sheet 150 defining the larger neck portion. In a non-limiting example the resonators 140 can be tuned to attenuate predetermined frequencies associated with engine sounds entering the acoustic resonators 140. This can include broadband noise and include frequencies lower than 3000 Hz. The aerogel layer 160 can further attenuate noise due to its large amount of free volume, rigid structure, large surface area, and low density; the free volume (also known as open cell content, porosity, or void fraction) of the open cell layer 160 can be 80% or higher as a non-limiting example.

Sound attenuating properties of the acoustic liner 100 can depend on the aerogel layer thickness 161; frequencies in the environment near the fan assembly 13 can vary from those farther away from the fan assembly 13, and the aerogel layer thickness 161 can be adjusted to attenuate various sound frequencies depending on where the acoustic liner 100 is placed. It is contemplated in a non-limiting example that the acoustic liner 100 can have a total thickness 170 of up to 2.0 inches, and further, that the aerogel layer 160 can have a thickness 161 of approximately 0.25 to 1.0 inch; however, the disclosure is not so limited, and in stationary or marine applications the total thickness 170 can be several inches thick as desired. It is further contemplated that the thickness 161 of the aerogel layer 160 can vary based on the location of the acoustic liner 100 within the aircraft engine assembly 11 as illustrated by the varied line thickness in FIG. 3; for example, a portion 300 of the acoustic liner 100 farther from the fan assembly 13 can have a decreased aerogel layer thickness 161 as shown in FIG. 3. Additionally, sound frequencies may also vary in the circumferential direction, and it is contemplated that the annular acoustic liner 100 can have a varied aerogel layer thickness 161 in the circumferential direction to attenuate different frequencies around the aircraft engine assembly 11. For example, a second portion 200 (FIG. 3) of the acoustic liner 100 may have different sound attenuation requirements than the portion 300 even if both portions 200, 300 are positioned the same axial distance away from the fan 13. By way of non-limiting examples, the portions 200, 300 can have different sound attenuation because the layer thickness 161 may be different for the second portion 200, or the aerogel layers 160 can include multiple layers of different material types or densities designed to attenuate multiple frequencies, maximize thermal insulation, or provide environmental or damage resistance in the portions in the portions 200, 300 as desired.

The aspects of the disclosure described above provide for a variety of benefits including that the use of aerogel can result in the attenuation of lower frequencies over a broader frequency range than what is presently achievable using traditional manufacturing materials (such as silica), as well as providing a thermal or fire protection barrier for the component on which the acoustic panel 100 is mounted. In addition, the improved sound attenuation from the aerogel layer 160 can allow for a reduction in cell height compared to typical acoustic panels that do not include aerogel, and therefore a reduction in total thickness 170 can occur while preserving the desired sound attenuation effects. It can be appreciated that a reduction in total thickness 170 can allow for less material to be used in construction of the acoustic liner 100, as well as reducing the weight of the liner 100, which can increase the efficiency of the engine 11. Further, the metallic skin layer 162 can prevent the absorption of liquids such as oil or water into the acoustic liner 100, the absorption of which can alter the frequency attenuating properties or hasten the material distress of the liner 100.

To the extent not already described, the different features and structures of the various embodiments may be used in combination with each other as desired. That one feature may not be illustrated in all of the embodiments and is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An acoustic liner, comprising:
   a support layer having a first side and a second side spaced from the first side and where the support layer includes a set of partitioned cavities extending between the first side and the second side and where the set of partitioned cavities have open faces;
   a first facing sheet operably coupled to the support layer such that the first facing sheet overlies and closes the open faces on the first side, with a first set of perforations included in the first facing sheet, and in fluid communication with at least some cavities included in the set of partitioned cavities to form a set of acoustic resonators;
   a second facing sheet operably coupled to the support layer such that the second facing sheet overlies and closes the open faces on the second side, with a second set of perforations included in the second facing sheet, and in fluid communication with the set of partitioned cavities;
   an aerogel layer operably coupled to the second facing sheet on an opposite side of the second facing sheet from the support layer, wherein a first thickness of a first portion of the aerogel layer is different than a second thickness of a second portion of the aerogel layer to differently attenuate frequencies at the first and second portions; and
   an acoustically transparent membrane located between the aerogel layer and the second facing sheet and configured to block fluid.

2. The acoustic liner of claim 1 wherein the second set of perforations in the second facing sheet correlate: to a perforation for every cavity in the set of partitioned cavities.

3. The acoustic liner of claim 1 wherein the aerogel layer is configured to attenuate noise at frequencies greater than 0 Hz and up to 3000 Hz.

4. The acoustic liner of claim 1 wherein the second set of perforations in the second facing sheet have a larger cross-sectional area than the first set of perforations in the first facing sheet.

5. The acoustic liner of claim 1 wherein the support layer is at least partially formed from an aluminum honeycomb core.

6. The acoustic liner of claim 1 wherein the acoustic liner has a total thickness between 0.25 inches and 2.0 inches.

7. The acoustic liner of claim 1, further comprising a metallic skin layer adjacent the aerogel layer.

8. The acoustic liner of claim 1 wherein at least one of the first facing sheet or the second facing sheet comprises composite skin.

9. The acoustic liner of claim 1 wherein the set of acoustic resonators and the aerogel layer are each configured to attenuate noise.

10. The acoustic liner of claim 1 wherein the second facing sheet has a larger percentage of open area compared to the first facing sheet.

11. The acoustic liner of claim 1 wherein at least one of the first set of perforations or the second set of perforations form inlets configured to allow air into the set of partitioned cavities and the aerogel layer.

12. The acoustic liner of claim 1 wherein a difference between the first thickness of the first portion of the aerogel layer and the second thickness of the second portion of the aerogel layer depends on a distance from each of the first portion and the second portion to a fan assembly of an aircraft engine.

13. The acoustic liner of claim 1 wherein a difference between the first thickness of the first portion of the aerogel layer and the second thickness of the second portion of the aerogel layer depends on a location of each of the first portion and the second portion within an aircraft engine.

14. The acoustic liner of claim 13 wherein the first portion of the aerogel layer and the second portion of the aerogel layer are positioned a same axial distance from the fan assembly and in different circumferential directions.

15. An aircraft engine assembly, comprising:
an aircraft engine;
a nacelle configured to surround the aircraft engine and having an inlet section that defines an inlet open to ambient air and where the nacelle at least partially defines an annular airflow path through the aircraft engine assembly; and
at least one acoustic panel operably coupled to at least one of the aircraft engine or the nacelle, the at least one acoustic panel comprising
a support layer having a first side and a second side spaced from the first side and where the support layer includes a set of partitioned cavities extending between the first side and the second side and where the set of partitioned cavities have open faces,
a first facing sheet operably coupled to the support layer such that the first facing sheet overlies and closes the open faces on the first side, with a first set of perforations included in the first facing sheet, and in fluid communication with at least some cavities included in the set of partitioned cavities to form a set of acoustic resonators,
a second facing sheet operably coupled to the support layer such that the second facing sheet overlies and closes the open faces on the second side, with a second set of perforations included in the second facing sheet, and in fluid communication with the set of partitioned cavities,
an aerogel layer operably coupled to the second facing sheet on an opposite side of the second facing sheet from the support layer, wherein a first thickness of a first portion of the aerogel layer is different than a second thickness of a second portion of the aerogel layer to differently attenuate frequencies at the first and second portions, and
an acoustically transparent membrane located between the aerogel layer and the second facing sheet and configured to block fluid,
wherein the first facing sheet is contiguous with the annular airflow path.

16. The aircraft engine assembly of claim 15 wherein the at least one acoustic panel is operably coupled to the aircraft engine and further comprises a metallic skin layer adjacent the aerogel layer.

17. The aircraft engine assembly of claim 15 wherein the second set of perforations in the second facing sheet have a larger cross-sectional area than the first set of perforations in the first facing sheet.

18. The aircraft engine assembly of claim 15 wherein the acoustic panel has a total thickness between 0.25 inches and 2.0 inches.

19. The aircraft engine assembly of claim 15 wherein the aerogel layer includes a non-constant thickness along at least a portion of a length of the annular airflow path.

20. The aircraft engine assembly of claim 19 wherein the aerogel layer has a non-constant thickness in a circumferential direction proximate a fan section of the aircraft engine.

21. An acoustic liner, comprising:
a support layer having a first side and a second side spaced from the first side and where the support layer includes a set of partitioned cavities extending between the first side and the second side and where the set of partitioned cavities have open faces;
a first facing sheet operably coupled to the support layer such that the first facing sheet overlies and closes the open faces on the first side, with a first set of perforations included in the first facing sheet, and in fluid communication with at least some cavities included in the set of partitioned cavities to form a set of acoustic resonators;
a second facing sheet operably coupled to the support layer such that the second facing sheet overlies and closes the open faces on the second side, with a second set of perforations included in the second facing sheet, and in fluid communication with the set of partitioned cavities;
an open cell layer operably coupled to the second facing sheet on an opposite side from the support layer and where the open cell layer is one of a sponge, fabric, foam, or gel, wherein a first thickness of a first portion of the open cell layer is different than a second thickness of a second portion of the open cell layer to differently attenuate frequencies at the first and second portions; and
an acoustically transparent membrane located between the open cell layer and the second facing sheet and configured to block fluid.

22. The acoustic liner of claim 21 wherein a free volume of the open cell layer is 80 percent or higher.

* * * * *